United States Patent [19]

Skinner

[11] Patent Number: 5,060,075
[45] Date of Patent: Oct. 22, 1991

[54] CRT DISPLAY DEVICE WITH VARIABLE LIGHT TRANSMISSION PANEL

[75] Inventor: Kenneth R. Skinner, Jefferson City, Tenn.

[73] Assignee: North American Philips Corporation, New York, N.Y.

[21] Appl. No.: 456,028

[22] Filed: Dec. 22, 1989

[51] Int. Cl.$^5$ .............................................. H04N 5/72
[52] U.S. Cl. ..................... 358/250; 358/252; 358/253
[58] Field of Search ........................... 358/88–90, 358/247, 252, 250, 253, 255, 902, 92; 350/311, 314, 318, 276, 355, 356; 313/461, 465, 466, 474, 479, 531

[56] References Cited

U.S. PATENT DOCUMENTS 4,338,000  7/1982  Kamimori et al. ................... 350/357
4,672,457  6/1987  Kyatt .................................. 358/241

OTHER PUBLICATIONS

Saxe et al. "Suspended Particle Display with Improved Properties" 1982 International Display Research Conference, pp. 177–179/ 5–82.
Rachner et al. "New Results in Colloid Display Technology SAE Technical" Paper Series 2–28 pp. 1–8.

Primary Examiner—Edward L. Coles, Sr.
Attorney, Agent, or Firm—Robert J. Kraus

[57] ABSTRACT

The contrast of a luminescent image produced by a CRT display device is improved by disposing a variable light transmissivity panel adjacent the CRT faceplate to intercept and attenuate ambient light reflected from the screen of the CRT. Control circuitry is provided to effect a decrease in the transmissivity of the panel in response to increasing ambient light intensity. The circuitry also effects an increase in the electron beam current with increasing ambient light intensity to increase the intensity of the luminescent image produced by the electron beam. When the device is not operating, the panel has a very low transmissivity causing the faceplate to appear dark.

4 Claims, 1 Drawing Sheet

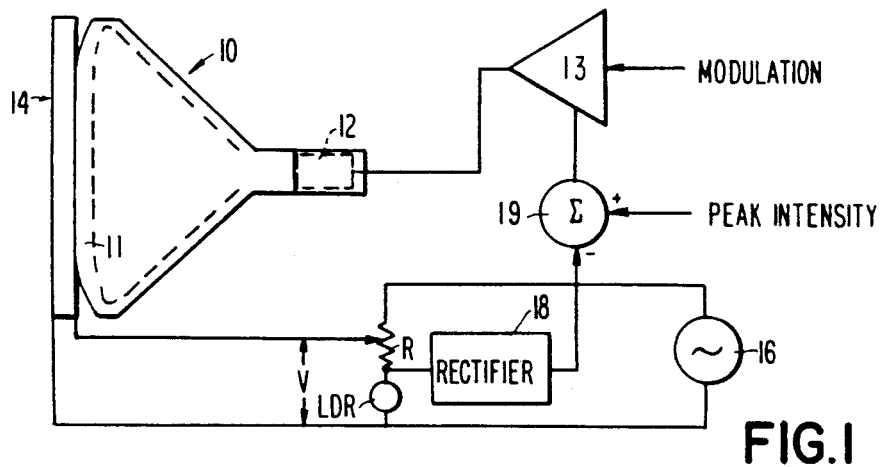
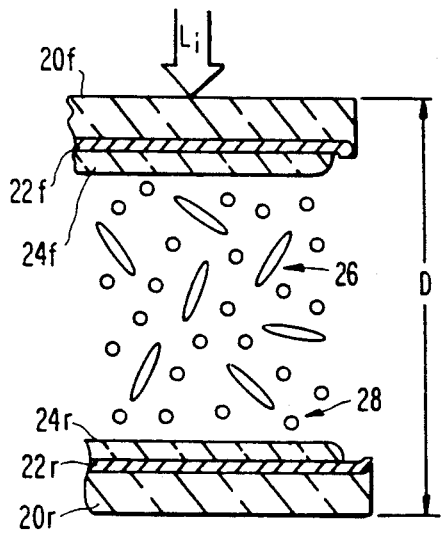
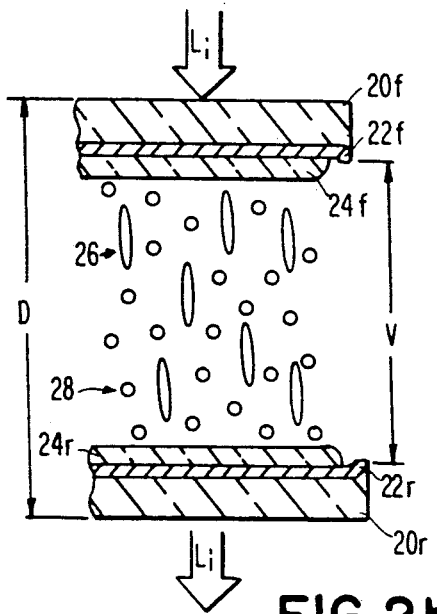
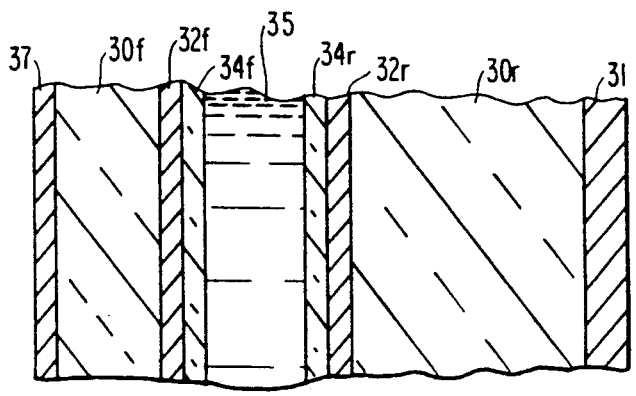

CRT DISPLAY DEVICE WITH VARIABLE LIGHT TRANSMISSION PANEL

BACKGROUND OF THE INVENTION

1. Field of the Invention

The invention relates to CRT display devices and in particular to means for reducing ambient light reflections from the CRT screens of such devices.

2. Description of Related Art

A common problem with CRT display devices, such as computer monitors and televisions, is disturbing reflections of ambient light from the luminescent screen of the CRT component utilized in each device. Such reflections reduce the contrast of the luminescent image produced by the CRT.

In order to attenuate these reflections, CRT faceplates are commonly made of tinted glass. Because the luminescent screen of a CRT is disposed on the inner surface of the faceplate, the reflected ambient light must pass through the thickness of the faceplate twice. The reflected ambient light is thus attenuated to a much greater extent than the light from the luminescent image produced on the screen, which passes through the faceplate only once.

Although this approach improves the visibility of the luminescent image, it has significant limitations. As the brightness of the ambient light radiation increases, so does that of its reflection. In order to maintain contrast, the brightness of the light from the luminescent image must be increased to predominate over the reflected light. In brightly lighted surroundings, the combined brightness levels of the luminescent image light and the reflected ambient light can be so high as to cause discomfort to the viewer.

Another limitation of the conventional tinted faceplate approach is the appearance it presents when the CRT is not in use. It is aesthetically desirable that the faceplate be dark when the CRT is off, but this cannot be achieved without tinting the faceplate to such a degree that it is virtually non-transmissive to ambient light reflected from the non-operating luminescent screen. Such a high degree of tinting is impractical, because it would severely attenuate the image from the operating luminescent screen when the CRT is on.

SUMMARY OF THE INVENTION

It is an object of the invention to provide a CRT display device which is capable of variably attenuating ambient light reflected from the luminescent screen in response to changes in the brightness level of the ambient light.

It is another object of the invention to provide such a device which presents a dark faceplate appearance when the CRT is not operating.

In accordance with the invention, the display device includes a variable light transmissivity panel disposed in front of an outer surface of the faceplate of the CRT. This panel cooperates with the faceplate in intercepting the ambient light radiation which is ultimately reflected from the luminescent screen and in passing the light radiation from the luminescent image produced at the screen. The light transmissivity of the panel varies with the magnitude of an applied control signal.

A light sensor and control circuitry are provided to control the light transmissivity of the panel. The light sensor is disposed in proximity to the faceplate for sensing the intensity of ambient light received at the faceplate. The control circuitry, which is electrically connected to the light sensor and the panel, produces the control signal. During operation of the display device, the control signal varies in response to the intensity of ambient light radiation received at the light sensor and effects variation of the panel light transmissivity inversely to variation of the ambient light intensity. When the display device is not in operation, the control signal produced effects a minimum light transmissivity of the panel.

The variable light transmissivity panel works in combination with the faceplate. By appropriately choosing the individual transmissivities of the panel and the faceplate, the resulting combination of the two transmissivities can be made to vary from a value which is higher than that of a conventional tinted faceplate alone to a very low value which virtually eliminates ambient light reflection back to a viewer. The high transmissivity value permits the display device to be operated at a lower electron beam current than is customary with the conventional fixed transmissivity display devices, especially in low ambient light conditions. The very low transmissivity value enables the presentation of a dark faceplate when the display device is not in operation.

BRIEF DESCRIPTION OF THE DRAWING

FIG. 1 is a schematic illustration of a preferred embodiment of the invention.

FIGS. 2a and 2b are schematic illustrations showing the operation of a specific type of variable light transmissivity panel which may be used in the preferred embodiment.

FIG. 3 is a cross sectional illustration of an integrated light transmissivity panel and a CRT faceplate.

DESCRIPTION OF THE PREFERRED EMBODIMENTS

FIG. 1 illustrates a preferred embodiment of an arrangement for controllably reducing ambient light reflection from a CRT display device. The arrangement includes a CRT 10, a variable light transmissivity panel 14, a light sensor LDR and control circuitry. The CRT comprises a glass envelope including a faceplate 11 and containing an electron gun 12. The control circuitry is electrically connected to the electron gun, the panel and the light sensor.

The CRT 10 is conventional, except that the glass selected for its faceplate 11 will advantageously have a higher transmissivity to visible light than would ordinarily be selected for a conventional display device. For example, a faceplate glass having a transmissivity of approximately 85% could be selected in lieu of one having a transmissivity of approximately 50%.

The variable light transmissivity panel is of a type which can be electrically controlled and is mounted immediately in front of the CRT faceplate 11. One type of variable transmissivity panel which is especially suitable is a colloidal display device, such as is described by H. Rachner and J. H. Morrissy in a paper entitled "New Results in Colloid Display Technology" which was presented at the International Congress Exposition in Detroit, MI held during the period 28 Feb.–4 Mar. 1983. Another paper describing such a colloidal display device is a paper by R. L. Saxe, R. I. Thompson and M. Forlini in a paper entitled "Suspended Particle Display With Improved Properties" presented at the International Display Research Conference in Cherry Hill, NJ in October 1982.

FIGS. 2a and 2b each illustrate a cross section of a portion of a colloidal panel in a different mode of operation. Such a panel comprises a sealed container formed by parallel plates 20f and 20r of a light transmissive material such as glass, which are held in a spaced apart relationship by means of a surrounding frame (not shown) of a material such as an inert plastic. The plates 20f, 20r are coated on their inner surfaces with respective thin transparent layers of a conductive material such as indium tin oxide forming electrodes 22f, 22r. Each of these electrodes 22f, 22r is in turn coated with a respective layer 24f, 24r of an insulating material such as silicon dioxide.

Typically, the overall depth D of the panel is about 0.375 inches, while the depth of the space between the opposing inner surfaces of the insulating layers 24f, 24r is about 50 to 75 microns. As is described in more detail in the aforementioned paper by Rachner and Morrissy, this space is filled with a colloidal suspension including needle shaped dichroic particles 26, having a length to breadth ratio of about 10, suspended in an organic liquid 28.

FIG. 2a shows the operation of the colloidal panel when the two electrodes 22f, 22r are at the same electrical potential. In this mode of operation, the dichroic particles 26 are randomly distributed and randomly oriented. The colloidal suspension absorbs virtually all visible light propagating through the space between the layers, regardless of polarization and regardless of which plate 20f, 20r the light enters. For example, as is shown in FIG. 2a, light radiation $L_i$ which is incident to the outer surface of the front plate 20f is absorbed to such a degree that substantially no remnant of this light radiation leaves the outer surface of rear plate 20r.

FIG. 2b shows the operation of the colloidal panel when an AC voltage V is applied to the electrodes 22f, 22r to establish an electric field between the electrodes. As the magnitude of the voltage is increased from zero volts, the electric field strength increases and the dichroic particles 26 gradually change their orientation until they are aligned with the field. As these particles move from their random orientation to one where they are aligned with the field, as is illustrated in FIG. 2b, their absorption of visible light propagating through the suspension decreases to a minimum. As the particles move toward such alignment, light radiation $L_i$ which is incident to the outer surface of either plate 20f, 20r is absorbed to a continuously decreasing degree and the proportion of light radiation $L_t$ transmitted through the panel continuously increases.

The light sensor LDR illustrated in FIG. 1 is a light dependent resistor or other photosensitive device which has a resistance that varies with the intensity of light impinging on the device. A suitable device is, for example, the type CL5M4 photocell available from Clairex Corporation located in Mount Vernon, N.Y. This device has a resistance that varies inversely with impinging light intensity. The sensor is mounted adjacent to the panel 14 such that it receives the same intensity of ambient light that is incident on the panel.

To control the transmissivity of the panel, the control circuitry which is electrically connected to the light sensor includes a variable resistance potentiometer R and a source 16 of AC potential 16. The AC source, which may be a transformer, provides the AC voltage needed to drive the panel 14. The voltage from the AC source is applied across the series combination of the potentiometer R and the sensor LDR. This series combination operates as a voltage divider for controlling the voltage V applied to the panel 14. As the ambient light intensity increases, the resistance of the sensor decreases, thereby causing a decrease in the voltage V and the panel transmissivity. Thus, as the ambient light intensity increases, the attenuation of reflected ambient light (which must twice pass through the panel) also increases. Conversely, as the ambient light intensity decreases, the resistance of the sensor increases, thereby causing an increase in the voltage V and the panel transmissivity. The transmissivity of the panel may be manually adjusted by adjusting the potentiometer R.

If the voltage V is decreased to zero, the panel automatically assumes the minimum transmissivity state illustrated in FIG. 2a. Thus, for example, if the source 16 receives its power from the equipment in which the CRT 10 is used, the screen of the CRT will automatically appear dark when the equipment is turned off.

As an alternative to placing the variable light transmissivity panel in front of the CRT faceplate, the panel may be made an integral part of the faceplate, as shown in FIG. 3. This figure illustrates a cross section of such an integral arrangement including a glass CRT faceplate 30r which both supports a luminescent screen 31 and serves as the rear plate of the panel. Similarly to the case of the separate panel 14 of FIG. 1, the front plate 30f, also of glass, is held in a spaced apart relationship with the faceplate by means of a surrounding frame (not shown) of a material such as an inert plastic. Again the plates 30f, 30r are coated on their inner surfaces with respective thin transparent layers of a conductive material such as indium tin oxide, forming electrodes 32f, 32r. Each of these electrodes 32f, 32r is in turn coated with a respective layer 34f, 34r of an insulating material such as silicon dioxide. The space between the opposing inner surfaces of the insulating layers 34f, 34r is again about 50 to 75 microns, and is filled with a colloidal suspension 35 including needle shaped dichroic particles. The front surface of the plate 30f is coated with an anti-reflective coating 37, such as a relatively inexpensive single layer magnesium fluoride coating or a relatively expensive multilayer dielectric coating. The advantage of this layer, which may also be included on the front surface of the panel 14, is subsequently described.

Although varying the light transmissivity of the separate or integral panel will by itself improve the contrast of the luminescent image produced by the CRT, the visibility of the image is further enhanced by increasing the intensity of this image simultaneously with a decrease in panel transmissivity. The visibility or contrast C of an image is conventionally defined as:

$$C = (I_i - I_b) / (I_i + I_b)$$

where $I_i$ is image intensity and $I_b$ is background intensity.

The contrast of a luminescent image is primarily affected by specular reflections from the front surface of the panel and by scattered reflections from the screen on the inner surface of the faceplate. Because each of these types of reflections has a separate and distinct type of disturbing influence on the image seen by the viewer, each type will be treated separately.

In terms of the characteristics of the CRT and panel arrangement illustrated in FIG. 1 or FIG. 3, the contrast $C_1$ of the image seen by a viewer against specular reflections of ambient light is expressed by the equation:

$$C_1 = \frac{\gamma^{\frac{1}{2}} I_c (1 - \alpha\delta)}{\gamma^{\frac{1}{2}} I_c (1 - \alpha\delta) + 2\beta\gamma I_a (1 - \alpha\delta) + 2\alpha\delta I_a}$$

and the contrast $C_2$ of the image seen by a viewer against scattered reflections of ambient light from the screen is expressed by the equation:

$$C_2 = \frac{I_c \gamma^{\frac{1}{2}}}{I_c \gamma^{\frac{1}{2}} + 2\beta I_a}$$

where:

$I_a$ is the average intensity of the ambient light incident to the front surface of the panel. This intensity is detected by the sensor LDR.

$I_c$ is the average intensity of the luminescent image produced at the screen when it is excited by an electron beam produced by the electron gun 12.

$\alpha$ is the proportion of ambient light reflected from the outer surface of the front plate of the panel.

$\beta$ is the proportion of ambient light passing through the panel and the faceplate 11 which is reflected back toward the viewer. This light is not reflected at a predictable angle, but is scattered because of the rough surface of the screen.

$\delta$ is the proportion of ambient light incident to the front surface of the antireflective coating which is reflected back toward the viewer.

$\gamma^{\frac{1}{2}}$ is the combined transmissivity of the faceplate 11 and the panel.

From an analysis of the equation for $C_1$ it has been found that image contrast can be markedly improved by incorporating the above mentioned antireflective coating on the front surface of either the separate panel or the integral panel. Beyond this improvement, both types of image contrast can be improved by varying the beam current with variations in ambient light.

To achieve such a variation of beam current, the control circuitry includes a rectifier 18 and a summing amplifier 19. An input of the rectifier is electrically connected to a junction between the potentiometer R and the light sensor LDR for receiving a voltage signal having an amplitude proportional to the resistance of the sensor. Typically the rectifier will include isolation means at its input, such as an amplifier with a very large input impedance, to avoid affecting the amplitude of the voltage signal. The rectifier produces at its output a filtered DC voltage signal representative of the resistance of the sensor LDR. The magnitude of this DC voltage signal varies inversely with the ambient light intensity received at the sensor.

The summing amplifier 19 is electrically connected between the rectifier and a gain control input of a drive amplifier 13 which supplies to the gun a drive signal for modulating the beam current to produce the image on the CRT screen. The summing amplifier 19 includes a positive summing input for receiving a peak intensity signal, which determines the maximum intensity of the image, and a negative summing input for receiving the DC voltage signal from the rectifier. Either or both of the two inputs ma be weighted to adjust the relative influences of the peak intensity signal and the DC voltage signal on the gain of the amplifier 19. The drive signal produced at the output of the amplifier controls the beam current produced by the gun, and ultimately controls the intensity of the luminescent image produced on the screen of the CRT.

The DC voltage signal produced by the rectifier 18 is applied to a negative summing input of the amplifier 19 to compensate for the inverse relationship of this signal with respect to the ambient light intensity. As the ambient light intensity decreases, the magnitude of the signal increases, effecting a decrease of the summing amplifier output signal magnitude and a consequent decrease in the luminescent image intensity. Conversely, as the ambient light intensity increases, the magnitude of the DC voltage signal decreases, effecting an increase of the summing amplifier output signal magnitude and a consequent increase in the luminescent image intensity.

The following table provides a comparison of the visibilities or contrasts of luminescent images produced by three different display devices, as the ambient light intensity increases from a reference value of 1 unit for fixed exemplary reflection coefficients of $\delta = 0.05$, $\alpha = 0.05$ and $\beta = 0.005$.

|  | $I_a$ | $\gamma^{\frac{1}{2}}$ | $I_c$ | $C_2$ | $C_1$ |
| --- | --- | --- | --- | --- | --- |
| Initial Conditions | 1 | 70 | .05 | .88 | .78 |
| No Variation | 2 | 70 | .05 | .78 | .67 |
| Vary $\gamma$ | 2 | 35 | .05 | .88 | .58 |
| Vary $\gamma$ and $I_c$ | 2 | 35 | .10 | .93 | .74 |

The first line of the table represents exemplary initial conditions for a panel and faceplate arrangement in accordance with the invention. In the table, all of the values for the intensities $I_a$ and $I_c$ are relative to the reference value of 1 unit. Each of the remaining lines in the table gives the contrasts $C_1$ and $C_2$ for a different variation of panel transmissivity and luminescent image intensity, when the ambient light intensity increases by 100%.

Note that if neither the transmissivity nor the image intensity $I_c$ are increased, both types of contrast decrease and the image becomes less visible against both types of reflections. This is representative of the degradation experienced in a prior art CRT display device having an antireflective coating on a tinted faceplate with a fixed transmissivity of 70%. If the transmissivity is decreased to 35%, however, the contrast $C_2$ remains at 0.88, while the contrast $C_1$ to 0.58. If, in addition to decreasing the transmissivity to 35%, the electron beam current is increased to a magnitude sufficient to increase the luminescent image intensity $I_c$ to 0.10, the contrast $C_2$ increases to 0.93, while the contrast $C_1$ decreases insignificantly to 0.74.

Although the invention has been described with reference to specific embodiments, many possible variations fall within the scope of the claims. For example, the control circuitry and the sensor may be changed to meet design requirements for the particular CRT display device to which the invention is applied. It is also possible to utilize a different type of variable light transmissivity panel, such as an electrochromic panel described in U.S. Pat. Nos. 4,596,635 and 4,596,722.

I claim:

1. In a CRT display device including an envelope having a faceplate of predetermined light transmissivity, a luminescent screen disposed on an inner surface of the faceplate and electron beam producing means disposed within the envelope for exciting the screen to effect production of a luminescent image, the improvement comprising means for controllably reducing ambient light reflections, said means including:
  (a) a variable light transmissivity panel disposed adjacent an outer surface of the faceplate for intercepting ambient light radiation reflected from the screen and for passing light radiation from the luminescent image, the light transmissivity of said panel varying with the magnitude of an applied control signal;
  (b) a light sensor disposed in proximity to the faceplate for sensing the intensity of ambient light received at the faceplate; and
  (c) control circuitry, electrically connected to the light sensor and to the variable light transmissivity panel, for producing the control signal;
during operation of the display device said control signal varying in response to the intensity of ambient light received at the light sensor and effecting variation of the panel light transmissivity inversely to variation of said ambient light intensity; and
during non-operation of the display device said control signal effecting a minimum transmissivity of the panel.

2. A CRT display device as in claim 1 where the variable light transmissivity panel forms an integral part of the faceplate of the CRT.

3. A CRT display device as in claim 1 or 2 including an antireflective coating on an outer surface of the variable light transmissivity panel.

4. A CRT display device as in claim 1 or 2 including means for controlling the electron beam producing means to effect variation of the luminescent image intensity with changes of the ambient light intensity.

* * * * *